(12) United States Patent
Jensen

(10) Patent No.: US 6,404,527 B1
(45) Date of Patent: Jun. 11, 2002

(54) METHOD AND APPARATUS FOR TRANSMITTING A RESPONSE SIGNAL FROM AN OPTICAL REPEATER TO A TERMINAL REQUESTING STATUS INFORMATION

(75) Inventor: Richard Andrew Jensen, Red Bank, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/301,437

(22) Filed: Apr. 28, 1999

(51) Int. Cl.[7] .............................................. H04B 10/02
(52) U.S. Cl. ......................... 359/177; 359/179; 359/181
(58) Field of Search .................................. 359/177, 110, 359/174, 194, 333, 341.4, 341.1, 341.3, 341.41, 337.13, 179, 181

(56) References Cited

U.S. PATENT DOCUMENTS 4,918,396 A * 4/1990 Halemane et al. .......... 359/333
5,535,037 A * 7/1996 Yoneyama ................... 359/177

* cited by examiner

*Primary Examiner*—Jason Chan
*Assistant Examiner*—Christina Y Leung

(57) ABSTRACT

A method for transmitting an optical response signal from a repeater to a terminal requesting status information pertaining to the repeater. In accordance with the method, in response to a command signal, a bias current applied to a laser pump within the repeater is modulated such that the laser pump generates modulated optical output power. The said modulation reflects the status information that is requested. An average value of the bias current applied to the laser pump is reduced while the bias current is being modulated. The modulated optical output power is applied to a doped optical fiber located within the repeater to amplitude modulate a communication signal traversing the doped optical fiber. A portion of the amplitude modulated communication signal is directed to the requesting terminal. The portion of the amplitude modulated communication signal may be received to detect a response signal embodied in the amplitude modulation.

21 Claims, 4 Drawing Sheets

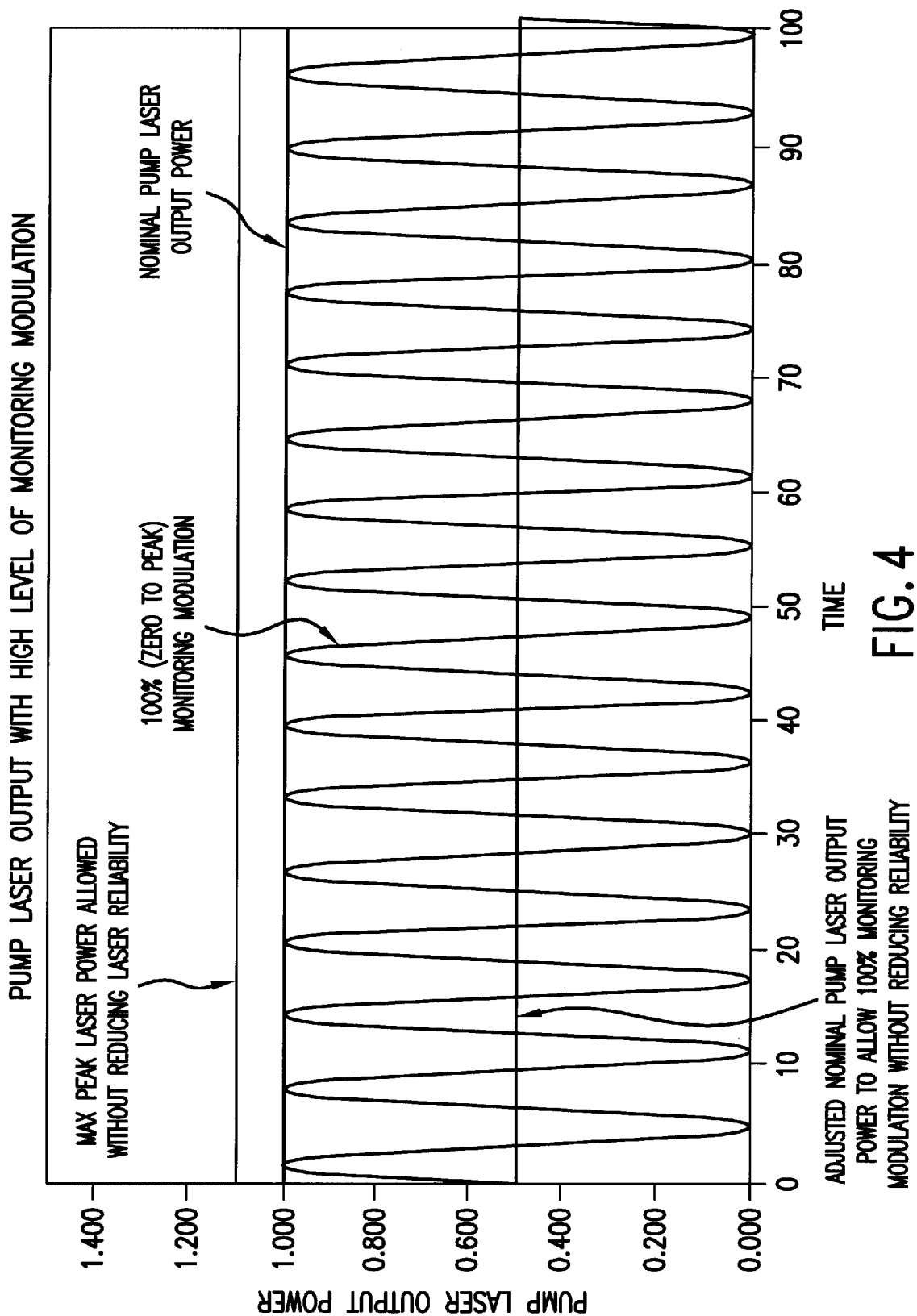

METHOD AND APPARATUS FOR TRANSMITTING A RESPONSE SIGNAL FROM AN OPTICAL REPEATER TO A TERMINAL REQUESTING STATUS INFORMATION

FIELD OF THE INVENTION

The present invention relates generally to a line monitoring system employed in a lightwave communication system, and more particularly to a line monitoring system employing digital command and response signaling.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss and dispersion associated with the optical fiber. To transmit optical signals over long distances, the lightwave systems may include a number of repeaters periodically located along the fiber route from the transmit terminal to the receive terminal. Each repeater boosts the weak received signal to compensate for the transmission losses which occurred from the last repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification.

Optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The doped fiber exhibits gain at the wavelength of the communication signal, providing the desired amplification. If the doped optical fiber is doped with erbium, for example, pump energy may be provided at a wavelength of 1485 nm or 980 nm, which coincide with the absorption peaks of erbium.

Optical communication systems often employ a line monitoring system (LMS) to monitor the performance of the repeaters and to control repeater functions. In particular, useful information that may be monitored includes degradations in pump power, loss in the amplifier, and loss in the transmission span. Repeater functions that can be controlled include power switching and laser switching, for example. The LMS may used when the communication system is in-service, out-of-service, or under degraded system operating conditions. One type of LMS that can be used is a digital command and response arrangement in which a terminal transmits a command signal over the transmission line. The command signal is addressed to a particular repeater or repeaters and specifies either the status information that is requested or the command and control function that is to be executed. The repeater generates a response signal that is returned to the requesting terminal over the opposite-going transmission path. The response signal includes the status information that was requested by the terminal. The response signal is transmitted in the form of AM modulation imposed on the optical amplifier gain, which requires that the power of the laser pump that pumps the amplifier undergo a corresponding modulation. Thus, to generate the response signal the average output power of the laser pump must be increased above its nominal value by a selected amount corresponding to the depth of modulation. The greater the modulation depth, the greater the SNR of the response signal arriving at the terminal. Unfortunately, it is difficult to increase the output power of a laser operating at 980 nm above its average output power without significantly impairing its reliability. As a result, the modulation depth of the response signal is limited.

Accordingly, it would be desirable to provide a command and response line monitoring system in which the SNR of the response signal can be increased for any purpose, including the previously described situation where it is desirable to increase the SNR of the response signal without requiring an increase in the average optical output power of the laser pump.

SUMMARY OF THE INVENTION

The present invention provides a method for transmitting an optical response signal from a repeater to a terminal requesting status information pertaining to the repeater. In accordance with the method, in response to a command signal, a bias current applied to a laser pump within the repeater is modulated such that the laser pump generates modulated optical output power. The modulation reflects the status information that is requested. An average value of the bias current applied to the laser pump is reduced while the bias current is being modulated. The modulated optical output power is applied to a doped optical fiber located within the repeater to amplitude modulate a communication signal traversing the doped optical fiber. A portion of the amplitude modulated communication signal is directed to the requesting terminal. The portion of the amplitude modulated communication signal may be received to detect a response signal embodied in the amplitude modulation.

Since the average bia current applied to the laser pump is decreased while undergoing modulation, the modulation depth may be increased without a corresponding increase in the average optical output power of the laser pump. Therefore, the signal-to-noise ratio of the response signal is increased since the modulation depth is increased.

BRIEF DESCRIPTION OF THE DRAWINGS

FIG. 4 shows a graph of a 100% peak to peak modulation imposed on the average value of the output power of the laser pump after the average laser pump power has been reduced.

DETAILED DESCRIPTION

Figure 1:
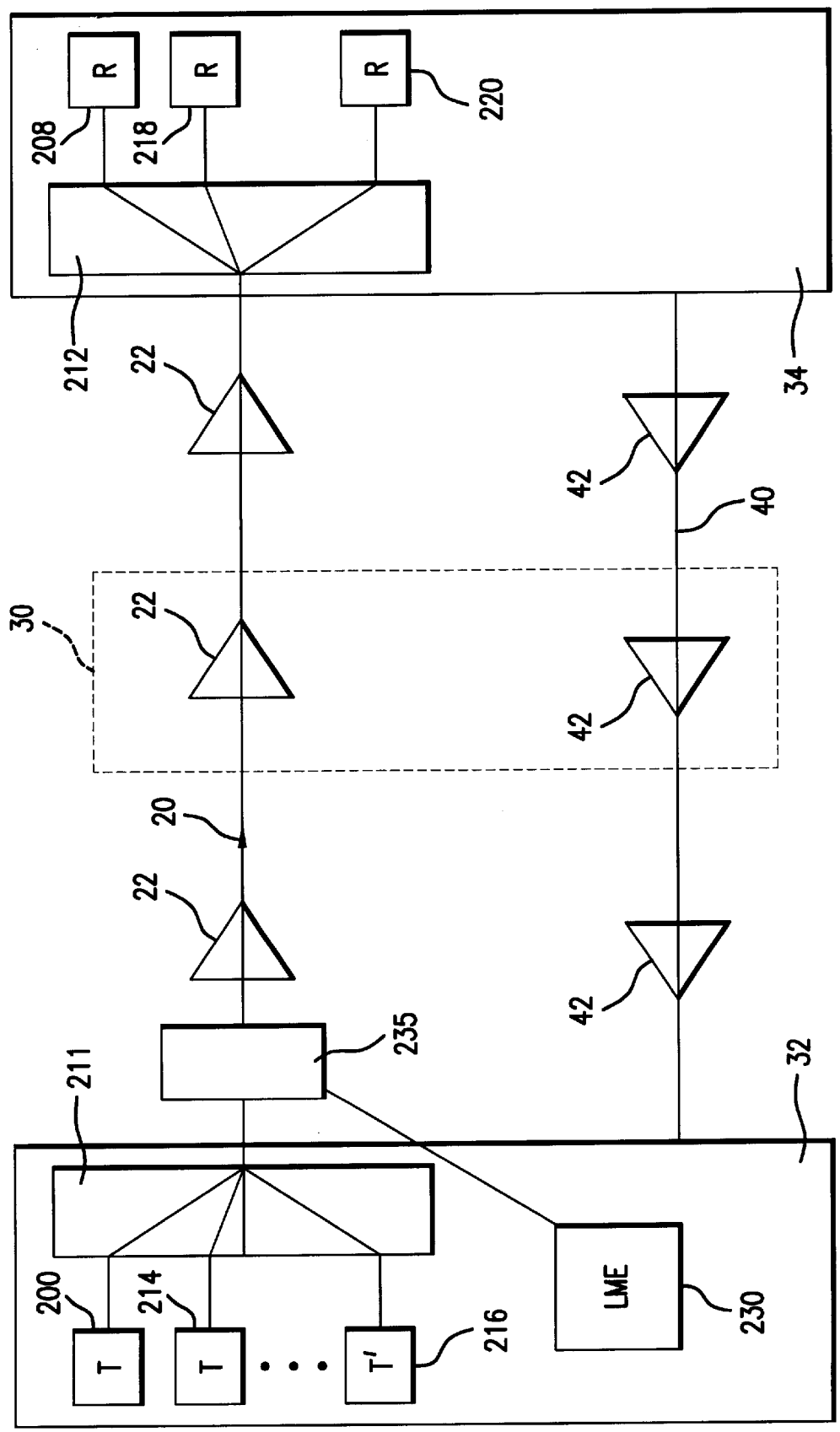
FIG. 1 shows a simplified schematic diagram of a lightwave communication system that employs optical repeaters which report status information to a requesting terminal in accordance with the present invention.

Referring to FIG. 1, there is disclosed a lightwave communication system which utilizes optical fiber amplifiers. The system includes transmitter/receiver terminals 32 and 34 and optical transmission fiber paths 20 and 40 supporting bi-directional communication. A plurality of optical amplifiers 22 and 42 are interposed in the fiber paths 20 and 40 between the transmitter/receiver terminals 34 and 32. Optical amplifiers 22 and 42 contain a length of doped fiber that provides a gain medium, an energy source that pumps the fiber to provide gain, and a means of coupling the pump energy into the doped fiber without interfering with the signal being amplified. These components of the optical amplifiers are shown in greater detail in FIG. 2.

As shown, terminal 32 includes optical communication transmitters 200, 214 and 216 to transmit optical communications channels at wavelength λ1, λ2 . . . λN, respectively. Multiplexer 210 multiplexes these signals together to form a multiplexed signal that is launched into optical fiber 20 for transmission to the receiving terminal 34. At the receiving terminal 215, demultiplexer 212 demultiplexes and routes λ1, λ2 . . . λN to receivers 208, 218 . . . 220, respectively. Of course, in a bidirectional communication system such as shown in FIG. 1, both terminals 32 and 34 serve as transmitters and receivers and hence, while not shown in FIG. 1 for purposes of clarity, each includes both transmitters and receivers.

Figure 2:
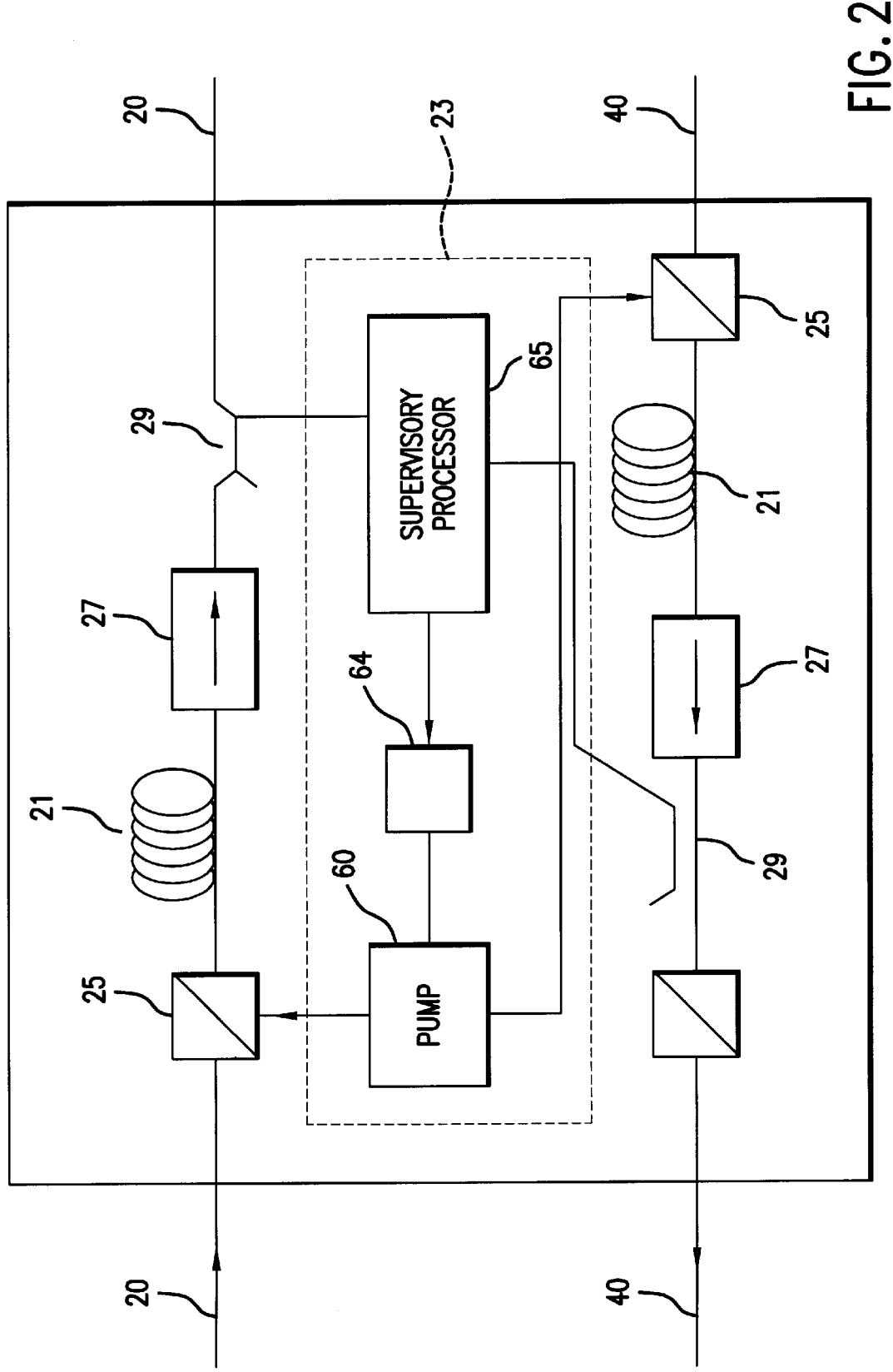
FIG. 2 shows a simplified diagram of one of the repeaters shown in FIG. 1.

Referring to FIG. 2, each optical amplifier includes a rare-earth doped optical fiber 21, such as an erbium doped fiber (EDF), coupled to a source of optical pump energy 60 via a coupler 25 such as a wavelength division multiplexer (WDM). An optical isolator 27 is typically located immediately downstream from each of the doped fibers. The isolator prevents amplified spontaneous emission from traveling back upstream and disrupting system stability by causing the amplifiers to oscillate. In undersea communication systems a pair of such optical amplifiers supporting opposite-traveling signals is housed in a single unit 30 (see FIG. 1) known as a repeater. The signals being transmitted from the terminals 32 and 34 are in optical form. There is no intermediate conversion of the data to electrical form. While only three optical amplifier pairs are depicted in FIG. 1 for clarity of discussion, it should be understood by those skilled in the art that the present invention finds application in transmission paths of all lengths having many additional (or fewer) sets of such repeaters.

Pump unit 23 provides the optical pump energy for both transmission directions of the amplifier pair. The pump unit 23 includes pump laser (or lasers) 60, pump controller 64 and supervisory/command response (SCR) processor 65. Pump laser 60 generates an optical pump beam at a suitable wavelength for producing amplification in EDF 21. For erbium doped fibers, pump wavelengths in the neighborhood of 1485 nm or 980 nm are suitable. The pump controller 64 comprises a comparator and feedback circuit for powering and controlling the pump laser 60. The SCR circuit 65 receives a portion of the optical signal tapped by couplers 29. The pump controller 64, responsive to signals from the SCR processor 65, applies current to pump laser 60 to adjust the total output power generated by the pump laser 60.

As indicated in FIG. 1, the communication system includes a line monitoring system (LMS) for monitoring the optical path between terminals to determine the status of the repeaters and to control repeater functions. In particular, the LMS determines changes and failures within each span of the system, including degradations of pump power, loss in the amplifier, and loss in the transmission span. As described in more detail below, the LMS is based on digital command and response signaling which provide communication between the terminals and each repeater.

Transmitting terminal 32 includes line monitoring equipment 230 that controls a modulator 235 for imposing a command signal onto the WDM channels transmitted along the transmission path 20. The command signal includes the address of the particular repeater from which data is being requested and the parameters that are to be measured (e.g., pump power, pump current, amplifier optical output power, and per channel power) and returned to the terminal 32. The command signal may be configured in a variety of different ways. For example, in one technique the command signal is transmitted in the form of AM modulation imposed on the WDM data channels. In another technique a broadband light source such as provided by a source of amplified spontaneous emission (ASE) is modulated and coupled with the WDM signals. In general, the present invention is applicable to a LMS using any appropriate command signaling arrangement.

The command signal is received by the SCR of the repeater from which status information is requested. The SCR receives the command from the optical coupler located at the output of the EDF. For example, in FIG. 2, if the command signal requests status information from repeater 30, SCR 65 receives the command through coupler 29. Responsive to the command signal, the SCR 65 generates an electronic response signal that is to be returned to the terminal requesting the status information. The electronic response signal is applied to pump controller 64. The pump controller 64 modulates the pump power of laser 60 by modulating the bias current applied thereto. Since the laser pump power applied to the EDF 21 is modulated, the gain or output power of the EDF 21 also will be modulated. Accordingly, the WDM signals being amplified by the EDF 21 undergo AM modulation that effectively embodies the response signal. The AM modulation is received by the SCR, which in turn modulates the laser 60 so that the AM modulation is directed to the opposite-going transmission path where it is combined with the WDM signal via a coupler. A receiver located in the terminal 32 detects the response signal that is superimposed as AM modulation on the returning WDM signal.

Figure 3:
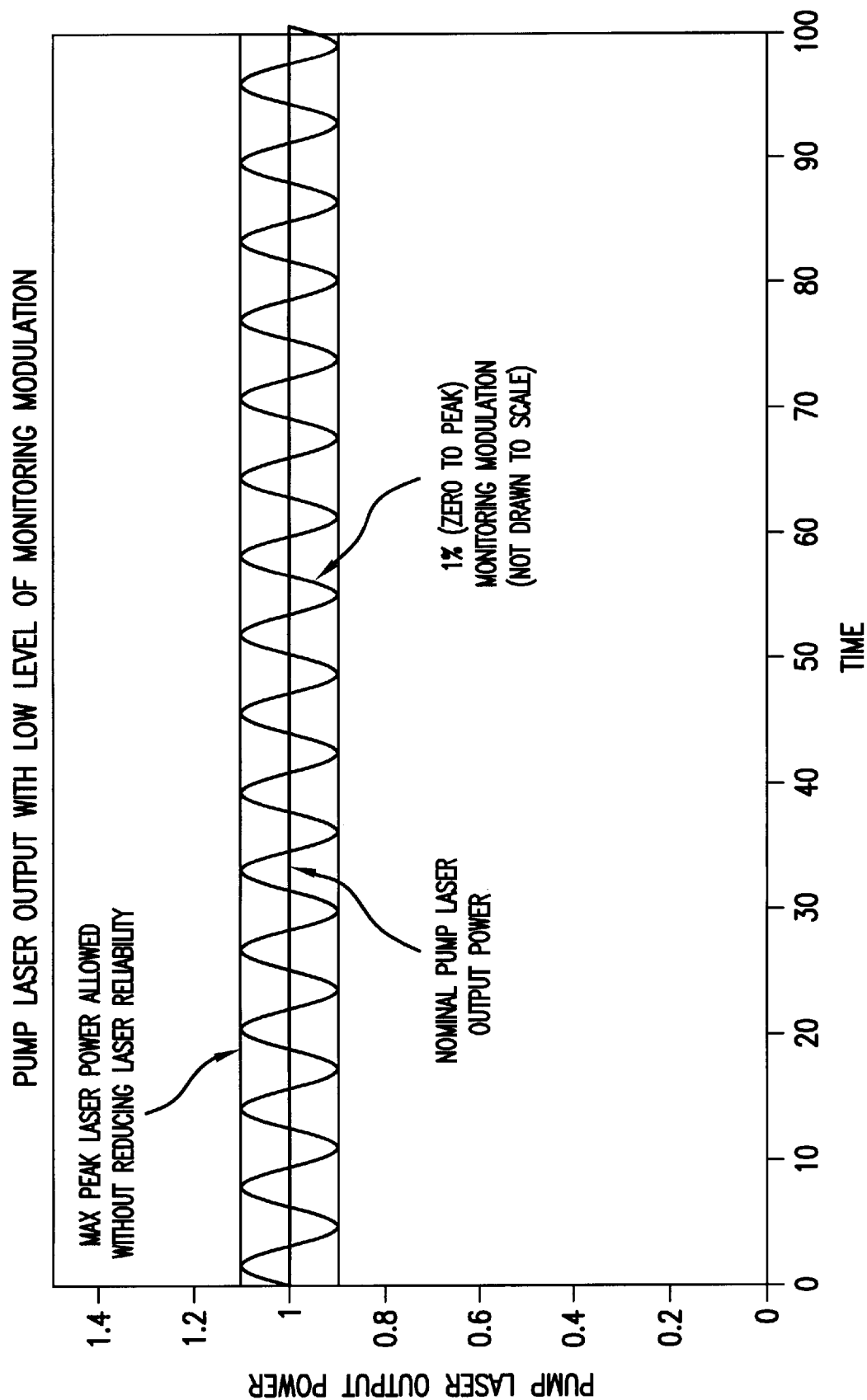
FIG. 3 shows a graph of a 1% peak to peak modulation imposed on the average value of the output power of the laser pump, which serves as the response signal.

The electrical SNR of the response signal received by the requesting terminal will depend on the modulation depth imposed by the bias controller on the pump power of the laser in the repeater. For laser pumps operating at 980 nm, the modulation depth is limited because at high power levels the reliability of the pump cannot be assured. For current generation 980 nm lasers, for example, the modulation depth is limited to about 1% above its nominal pump power. Greater pump power could lead to catastrophic failure of the laser. Unfortunately, this low modulation index limits the electrical SNR of the response signal received at the requesting terminal. FIG. 3 shows a graph of a 1% peak-to-peak modulation signal imposed on the average value of the output power of the laser pump.

In accordance with the present invention, the average bias current applied to the laser pump generating the response signal is lowered prior to generating the response signal. In this manner the modulation depth of the response signal may be increased without increasing the peak output power of the laser. This method is illustrated in FIG. 4, which shows the laser pump output as a function of time. The average output power of the laser pump prior to modulating the bias current is denoted 0 dB and indicated by line 41. As shown, the pump power is reduced from its average value to a valued denoted by line 43. The modulation depth of the response signal may be increased accordingly while remaining below the average value of the pump power denoted by line 41. In the example shown in FIG. 4, the bias current applied to the laser pump is reduced by 50% and the modulation depth is increased to 100% peak-to-peak. Clearly, the laser peak power remains below its nominal average value, which often defines the maximum power above which the laser is no longer reliable. By increasing the modulation depth as shown in FIG. 4, the performance of the response signal received at the terminal is increased by 38–40 dB (electrical SNR). Once the response signal has been generated, the average value of the bias current applied to the laser pump may be returned to its nominal value.

Of course, by decreasing the average output power of the laser, impairment to the data signal may be anticipated because of the corresponding decrease in the gain of the EDF. However, in practice this is not a serious problem because of the self-healing nature of optical transmission systems employing optical amplifiers. Specifically, optical amplifiers are typically operated in a state of compression in which a decrease in optical input power is compensated by increased amplifier gain. That is, in compression the amplifiers regulate the optical power of the signals propagating through the optical fiber. A series of optical amplifiers extending along a transmission path and operating in compression compensates for system degradations through a process of automatic gain adjustment. For example, the effect of reducing the power of one pump laser by 50% in a typical transmission system is not measurable using standard performance metrics (e.g., BER, Q, optical SNR). As a result, the optical output power from the amplifier remains at a substantially constant level even as the optical input power undergoes fluctuations. In other words, transmission systems of this type are designed to maintain the SNR of the data signal. Accordingly, decreasing the output power of a given EDF will not adversely effect overall system performance because the decrease will be compensated by a gain increase in subsequent downstream amplifiers.

What is claimed is:

1. A method of transmitting an optical response signal from a repeater to a terminal requesting status information pertaining to the repeater, said method comprising the steps of:
   a. responsive to a command signal, modulating a bias current applied to a laser pump within the repeater such that the laser pump generates modulated optical output power, said modulation reflecting the requested status information;
   b. reducing an average value of said bias current applied to the laser pump while performing step (a);
   c. applying said modulated optical output power to a doped optical fiber located within the repeater to amplitude modulate a communication signal traversing said doped optical fiber;
   d. directing a portion of the amplitude modulated communication signal to the requesting terminal.

2. The method of claim 1 wherein said communication signal is a wavelength division multiplexed signal.

3. The method of claim 1 wherein said portion of the amplitude modulated communication signal is directed along first transmission path going in an opposite direction with respect to a second transmission path on which said command signal is directed.

4. The method of claim 1 wherein said repeater includes a rare-earth doped optical amplifier.

5. The method of claim 4 wherein said optical amplfier is an erbium-doped fiber amplifier.

6. The method of claim 5 wherein said repeater provides optical gain to both first and second transmission paths.

7. The method of claim 1 further comprising the step of generating the command signal by amplitude modulating an optical data channel.

8. The method of claim 1 further comprising the step of generating the command signal by coupling optical energy from a broadband light source with optical data signals.

9. The method of claim 7 further comprising the step of receiving said portion of the amplitude modulated communication signal to detect a response signal embodied in said amplitude modulation.

10. The method of claim 1 wherein said laser pump operates at a wavelength of about 980 nm.

11. The method of claim 10 wherein said bias current applied to said laser pump is reduced by about 50%.

12. The method of claim 11 wherein the step of modulating the bias current comprises the step of modulating the bias current to achieve a maximum optical output level comparable to a nominal power level of said laser pump.

13. A method for monitoring performance of an optical transmission system having a plurality of repeaters extending along first and second optical transmission paths for supporting bidirectional communication, said method comprising the steps of:
   a. generating a command signal requesting status information for transmission along the first optical transmission path for receipt by a given repeater;
   b. responsive to the command signal, modulating a bias current applied to a laser pump within said given repeater such that the laser pump generates modulated optical output power, said modulation reflecting the requested status information;
   c. reducing an average value of said bias current applied to the laser pump while performing step (b);
   d. applying said modulated optical output power to a doped optical fiber located within said given repeater to amplitude modulate a communication signal traversing said doped optical fiber;
   e. directing a portion of the amplitude modulated communication signal to a terminal along the second optical transmission path which requests the status information; and
   f. receiving said portion of the amplitude modulated communication signal to detect a response signal embodied in said amplitude modulation.

14. The method of claim 13 wherein said communication signal is a wavelength division multiplexed signal.

15. The method of claim 13 wherein said given repeater includes a rare-earth doped optical amplifier.

16. The method of claim 15 wherein said optical amplifier is an erbium-doped fiber amplifier.

17. The method of claim 13 wherein said given repeater provides optical gain to both the first and second transmission paths.

18. The method of claim 13 wherein the command signal is generated by coupling optical energy from a broadband light with optical data signals.

19. The method of claim 13 wherein said laser pump operates at a wavelength of about 980 nm.

20. The method of claim 19 wherein said bias current applied to said laser pump is reduced by about 50%.

21. The method of claim 19 wherein the step of modulating the bias current comprises the step of modulating the bias current to achieve a maximum optical ouput level comparable to a nominal power level of said laser pump.

* * * * *